United States Patent
Lu

(10) Patent No.: US 11,217,853 B2
(45) Date of Patent: Jan. 4, 2022

(54) POWER-SUPPLYING BATTERY OF ELECTRIC VEHICLE

(71) Applicant: DAR YUN ENERGY SCIENCE TECHNOLOGY CO., LTD., Taoyuan (TW)

(72) Inventor: Yung-Chi Lu, Taoyuan (TW)

(73) Assignee: DAR YUN ENERGY SCIENCE TECHNOLOGY CO., LTD., Taoyuan (TW)

(*) Notice: Subject to any disclaimer, the term of this patent is extended or adjusted under 35 U.S.C. 154(b) by 155 days.

(21) Appl. No.: 16/782,072

(22) Filed: Feb. 5, 2020

(65) Prior Publication Data

US 2021/0242441 A1 Aug. 5, 2021

(51) Int. Cl.
| | |
|---|---|
| H01M 50/20 | (2021.01) |
| H01M 10/44 | (2006.01) |
| H01M 10/42 | (2006.01) |
| H01M 50/502 | (2021.01) |
| B60L 53/53 | (2019.01) |
| B60L 50/60 | (2019.01) |
| H02J 7/34 | (2006.01) |
| H02J 7/00 | (2006.01) |

(52) U.S. Cl.
CPC ......... *H01M 50/20* (2021.01); *H01M 10/425* (2013.01); *H01M 10/441* (2013.01); *H01M 50/502* (2021.01); *B60L 50/60* (2019.02); *B60L 53/53* (2019.02); *H01M 2010/4271* (2013.01); *H01M 2220/20* (2013.01); *H02J 7/007* (2013.01); *H02J 7/34* (2013.01); *H02J 7/342* (2020.01); *Y02T 10/70* (2013.01); *Y02T 10/7072* (2013.01)

(58) Field of Classification Search
CPC .. H01M 50/20; H01M 50/502; H01M 10/425; H01M 10/441; H01M 2010/4271; H01M 2220/20; H02J 7/007; H02J 7/342; H02J 7/34; Y02T 10/7072; Y02T 10/70; B60L 53/53; B60L 50/60
See application file for complete search history.

(56) References Cited

U.S. PATENT DOCUMENTS

| | | | | |
|---|---|---|---|---|
| 2009/0297939 | A1* | 12/2009 | Yoon | H01M 50/502 429/160 |
| 2014/0255748 | A1* | 9/2014 | Jan | H01M 10/04 429/120 |

(Continued)

*Primary Examiner* — Alexander Usyatinsky
(74) *Attorney, Agent, or Firm* — Leong C. Lei

(57) ABSTRACT

A power-supplying battery of an electric vehicle includes a plurality of chargeable batteries that are grouped into at least two first battery groups, and the chargeable batteries of each first battery group are divided into at least two second battery groups that are electrically connected in parallel. Each first battery group is electrically connected to each other in parallel to form a complete set of the power-supplying battery. During charging of the power-supplying battery, an external charging power source is set in electric conduction with the power-supplying battery and a current or a voltage of the charging power source is supplied, in a divided manner, to charge each first battery group and the second battery groups thereof. During discharging of the power-supplying battery, a voltage or a current of each first battery group is combined with each other for output as a total.

3 Claims, 2 Drawing Sheets

(56) References Cited

U.S. PATENT DOCUMENTS

| | | | |
|---|---|---|---|
| 2014/0302360 A1* | 10/2014 | Klammler | H01M 10/613 |
| | | | 429/72 |
| 2016/0093930 A1* | 3/2016 | Biskup | H01M 50/502 |
| | | | 429/72 |
| 2016/0294204 A1* | 10/2016 | Deokar | H02M 3/33584 |
| 2017/0005316 A1* | 1/2017 | Harris | H01M 50/20 |
| 2017/0005371 A1* | 1/2017 | Chidester | B60L 15/20 |
| 2017/0125770 A1* | 5/2017 | Kim | H01M 50/20 |
| 2017/0229746 A1* | 8/2017 | Rawlinson | H01M 10/663 |
| 2017/0229748 A1* | 8/2017 | Rawlinson | H01M 50/20 |
| 2017/0229749 A1* | 8/2017 | Rawlinson | H01M 50/20 |

* cited by examiner

POWER-SUPPLYING BATTERY OF ELECTRIC VEHICLE

TECHNICAL FIELD OF THE INVENTION

The present invention relates to a power-supplying battery of an electric vehicle, and more particularly to an arrangement in which each of first battery groups includes a plurality of chargeable batteries that are divided into at least two second battery groups electrically connected in parallel and each of the first battery groups is electrically connected to each other in series to form a complete set of a power-supplying battery, whereby during charging of the power-supplying battery, an external charging power source is set in electric conduction with the power-supplying battery to allow a current and/or a voltage of the charging power source to be supplied, in a divided manner, to respectively charge each of the first battery groups and each of the second battery groups arranged in the first battery group.

DESCRIPTION OF THE PRIOR ART

With the advent of the consciousness of environmental protection, the ideas of energy saving and carbon reduction are gradually gaining attention of people. The progress and exploitation of green energy is now a focus of development that global countries are actively engaged in. For such a reason, electric vehicles are becoming popularized recently and a major cause is that the electric vehicles does not consume traditional fuels, such as fossil fuels, to provide a driving power and as such, no exhaust will be generated, making them in full compliance with the environmental protection concept of energy saving and carbon reduction.

An electric vehicle uses a battery module provided in the vehicle to supply electric energy to a driving motor, and the driving motor drives the electric vehicle coupled thereto so that the driving motor converts the electric energy to kinetic energy to drive wheels of the electric vehicle to rotate, enabling the electric vehicle to move without consuming the traditional fuels.

A cruise range of an electric vehicle is determined by the capacity of the battery module carried on the electric vehicle. However, the capacity of a battery module that is contemporarily available is only limited and it is generally not possible for making an extraordinary long journey. Compared to vehicles that are operated with the traditional fuels, the electric vehicles that are available today have only a very poor cruise range.

In addition, one of the disadvantages that the electric vehicles are not widely popular today is that the battery module that is provided for the electric vehicle is very poor in respect of the charging performance. In other words, during a charging process of the electric vehicle battery module, the known battery module that is made up of a plurality of chargeable batteries that are electrically connected in series suffers charging being inhomogeneous among the plurality of chargeable batteries that make up the known battery module. Also, it is often that the batteries of the known battery module may partly get over heated, and this would lead to potential risks of explosion of the battery module. Further, inhomogeneous charging among the plurality of batteries that make up the battery module may lead to some of the batteries have excessively low capacities during a discharging process of the battery module, and this easily causes damage of the battery module.

SUMMARY OF THE INVENTION

The present invention provides a power-supplying battery of an electric vehicle, which comprises a plurality of chargeable batteries. The plurality of chargeable batteries are grouped into at least two first battery groups. Each of the first battery group includes predetermined ones of the plurality of chargeable batteries. The chargeable batteries of each of the first battery groups are further divided into at least two second battery groups. The chargeable batteries of each of the second battery groups are electrically connected in series, and then each of the second battery groups is electrically connected to each other in parallel to form the first battery group. Each of the first battery groups has a preset voltage value and a preset current value. Each of the first battery groups has first positive/negative contacts that are in conduction with a parallel circuit formed of the second battery groups arranged therein. The first positive/negative contacts of the plurality of first battery groups are electrically connected in parallel to form a complete set of a power-supplying battery. The power-supplying battery has second positive/negative contacts that are in conduction with a parallel circuit formed of the plurality of first battery groups arranged therein.

The features of the present invention are that each of the first battery groups is made up of a plurality of chargeable batteries that are divided into at least two second battery groups, and each of the second battery groups includes a plurality of chargeable batteries that are electrically connected to each other through series connection and each of the second battery groups is electrically connected to each other through parallel connection to form the first battery group, and each of the first battery groups is electrically connected to each other through parallel connection to form a complete set of a power-supplying battery. As such, during charging of the power-supplying battery, an external charging power source is set in electric conduction with the power-supplying battery, and a current and a voltage from the charging power source are supplied, in a divided manner, to respectively charge each of the first battery groups and each of the second battery groups thereof. During discharging of the power-supplying battery, a voltage or a current from each of the first battery groups is combined with each other at second positive/negative contacts to provide a total output, so as to achieve a stable charging/discharging operation of the power-supplying battery and also preventing any situation of high temperature occurring during charging of the power-supplying battery.

DETAILED DESCRIPTION OF THE PREFERRED EMBODIMENT

Figure 1:
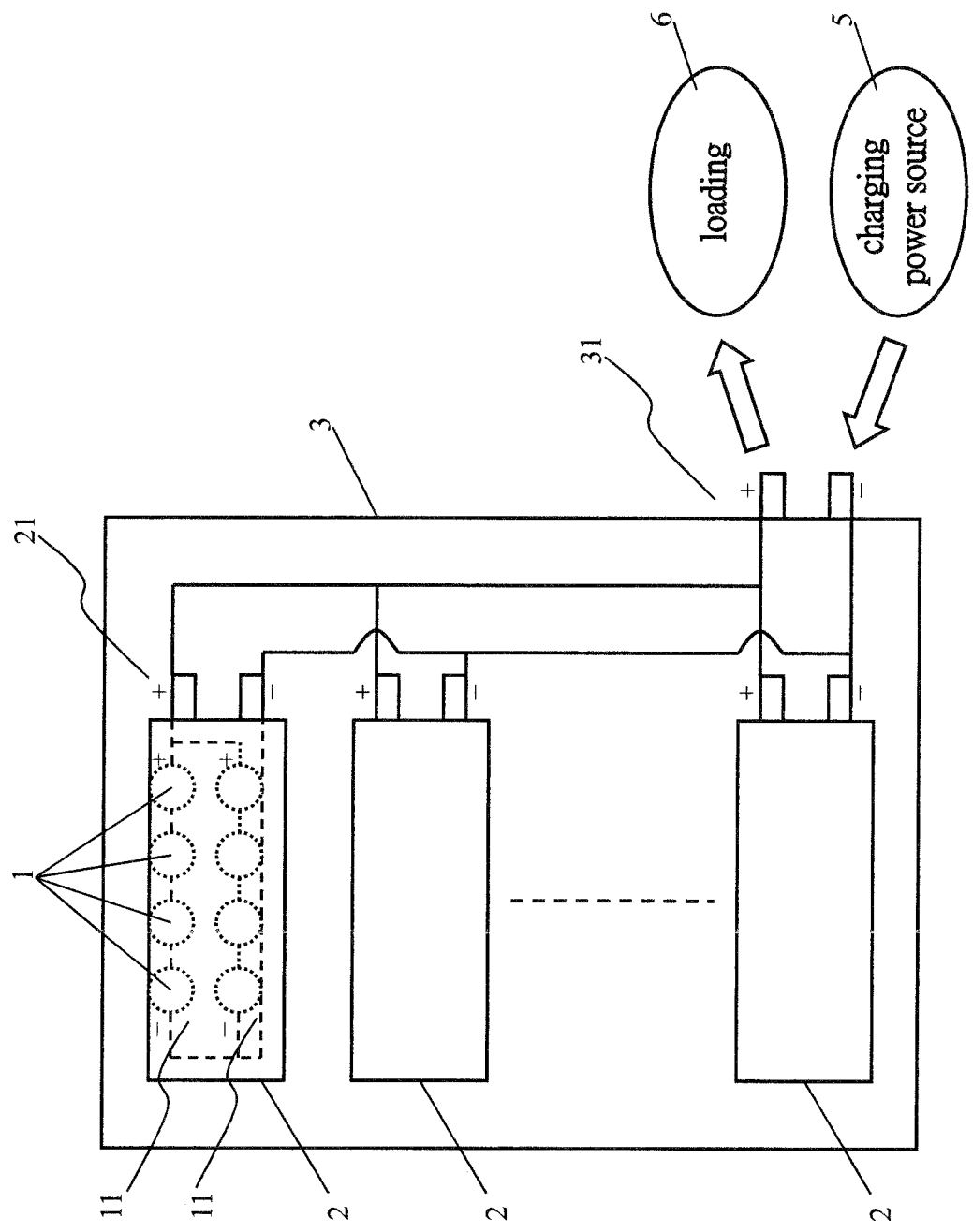
FIG. 1 is a schematic view showing an architecture of a power-supplying battery of an electric vehicle according to a first embodiment of the present invention.
Figure 2:
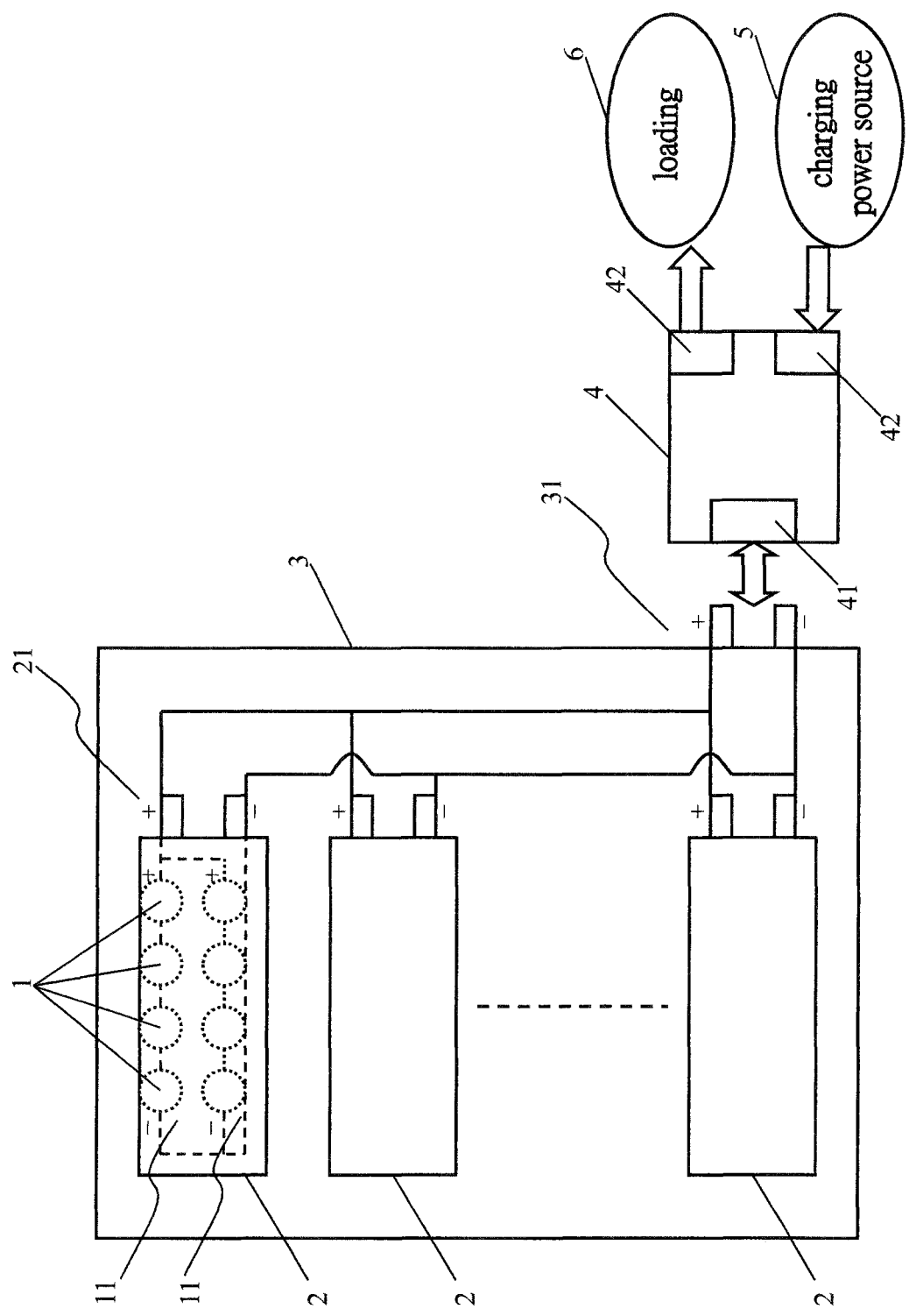
FIG. 2 is a schematic view showing an architecture of a power-supplying battery of an electric vehicle according to a second embodiment of the present invention.

Referring first to FIGS. 1 and 2, the present invention discloses a power-supplying battery of an electric vehicle, which comprises a plurality of chargeable batteries 1.

The plurality of chargeable batteries 1 is grouped in such a way as to form at least two first battery groups 2. Each of the first battery group 2 includes a plurality of chargeable batteries 1 that are of a predetermined number, and each of the first battery groups 2 includes a plurality of chargeable batteries 1 that are divided into second battery groups 11 of which the number is at least two, wherein each of the second battery groups 11 includes a plurality of chargeable batteries 1 that are electrically connected through series connection and each of the second battery groups 11 is electrically connected to each other through parallel connection to form the first battery group 2. Each of the first battery group 2 has a voltage value and a current value that are set in advance. Each of the first battery groups 2 has first positive/negative contacts 21 that are set in electric conduction with the plurality of second battery groups 11 that are arranged therein and in parallel connection with each other as a circuit. The first positive/negative contacts 21 of the plurality of first battery groups 2 are electrically connected, through parallel connection, to each other to form a complete set of a power-supplying battery 3. The power-supplying battery 3 has second positive/negative contacts 31 that are set in electric conduction with the plurality of first battery groups 2 that are arranged therein and in parallel connection with each other as a circuit.

In an example of the present invention, each of the chargeable batteries 1 has a voltage value of 5V and a current value of 3 A. When each of the first battery groups 2 includes eight (8) chargeable batteries 1, and each of the first battery groups 2 is equally divided into two second battery groups 11, each of the second battery groups 11 has a voltage value of 20V and a current value of 3 A. Further, each of the first battery groups 2 includes two second battery groups 11 connected in parallel, and thus, each of the first battery groups 2 has a voltage value of 20V and a current value of 6 A. Further, if the power-supplying battery 3 includes three (3) first battery groups 2, then the power-supplying battery 3 has a total voltage value of 20V and a total current value of 18 A.

When a charging operation is conducted on the power-supplying battery 3, an external charger is applied to charge the power-supplying battery 3. For example, an output terminal of the charger is manipulated to form electric conduction with the second positive/negative contacts 31 of the power-supplying battery 3 by means of a transmission cable, so that a charging power source 5 supplied from the charger is in electric conduction with the power-supplying battery 3 and the charging power source 5 (such as output voltage and output current) supplied from the charger is set in match with the power-supplying battery 3 to have the current and the voltage from the charging power source 5 to be supplied, in a divided manner, to charge each of the first battery groups 2 and each of the second battery groups 11 thereof.

When the power-supplying battery 3 electrically discharges, the second positive/negative contacts 31 of the power-supplying battery 3 that are electrically connected with a loading 6 (such as an electric motor, a circuit board, and a light emission element) allow a voltage and a current supplied from each of the first battery groups 2 merge at the second positive/negative contacts 31 to output as a total supply of electricity to the loading 6.

In another example of the present invention, a control circuit 4 is further included. The control circuit 4 comprises a first connection port 41 and a plurality of second connection ports 42. The first connection port 41 is electrically connected to the second positive/negative contacts 31 of the power-supplying battery 3, and the plurality of second connection ports 42 are provided for electrical connection with the charging power source 5 or the loading 6 that is arranged outside, so that control and regulation are achieved with the control circuit 4 in respect of output or input of electricity out of or into the power-supplying battery 3. During charging of the power-supplying battery 3, an external charger supplies the charging power source 5 that is transmitted through one of the second connection ports 42 to the control circuit 4, and the control circuit 4 transmits the charging power source 5 through the first connection port 41 to the power-supplying battery 3, so that the current and voltage of the charging power source 5 are supplied, in a divided manner, to charge each of the battery group 2. During discharging of the power-supplying battery 3, a total output of electricity of the power-supplying battery 3 is transmitted through the first connection port 41 to the control circuit 4, and the control circuit 4 applies the electricity of the power-supplying battery 3 to the loading 6 to supply the loading 6 with electricity.

It is noted that the control circuit 4 is provided with a setting value of output voltage that is set in advance, in order to serve as a mechanism for limiting an output voltage value of the power-supplying battery 3. When the power-supplying battery 3 electrically discharges and an output voltage of the power-supplying battery 3 is less than or equal to the preset output voltage setting value of the control circuit 4, the first connection port 41 of the control circuit 4 is set in a closed or OFF state in order to make the power-supplying battery 3 stop discharging and thus preventing the power-supplying battery 3 from over-discharging, which leads to damage of the power-supplying battery 3.

In summary, the features of the present invention are that each of the first battery groups 2 is made up of a plurality of chargeable batteries 1 that are divided into at least two second battery groups 11, and each of the second battery groups 11 includes a plurality of chargeable batteries 1 that are electrically connected to each other through series connection and each of the second battery groups 11 is electrically connected to each other through parallel connection to form the first battery group 2, and each of the first battery groups 2 is electrically connected to each other through parallel connection to form a complete set of a power-supplying battery 3. As such, during charging of the power-supplying battery 3, an external charging power source 5 is set in electric conduction with the power-supplying battery 3, and a current and a voltage from the charging power source 5 are supplied, in a divided manner, to respectively charge each of the first battery groups 2 and each of the second battery groups 11 thereof. During discharging of the power-supplying battery 3, a voltage or a current from each of the first battery groups 5 is combined with each other at second positive/negative contacts 31 to provide a total output, so as to achieve a stable charging/discharging operation of the power-supplying battery 3 and also preventing any situation of high temperature occurring during charging of the power-supplying battery 3.

I claim:

1. A power-supplying battery of an electric vehicle, comprising:

a plurality of chargeable batteries, which are grouped into at least two first battery groups, wherein each of first battery groups comprises a predetermined number of the plurality of chargeable batteries, the chargeable batteries of each of the first battery groups being divided into at least two second battery groups, each of which comprises chargeable batteries that are electrically connected through series connection, each of the second battery groups being electrically connected to each other through parallel connection to form the first battery group, wherein each of the first battery groups has a preset voltage value and a preset current value, each of the first battery groups having first positive/negative contacts that are set in electric conduction with the second battery groups of the first battery group, the first positive/negative contacts of the first battery groups being electrically connected in parallel to form a complete set of a power-supplying battery, wherein the power-supplying battery comprises second positive/negative contacts that are in conduction with a parallel circuit formed of the first battery groups;

wherein during charging of the power-supplying battery, the second positive/negative contacts are adapted to set in electric conduction with an external charging power source, so that a current or a voltage from the charging power source is supplied, in a divided manner, to charge each of the first battery groups and each of the second battery groups thereof; and during discharging of the power-supplying battery, a voltage or a current from each of the battery groups is combined with each other at the second positive/negative contacts for output.

2. The power-supplying battery of the electric vehicle according to claim 1, further comprising a control circuit, wherein the control circuit comprises a first connection port and a plurality of second connection ports, the first connection port being electrically connectable with the second positive/negative contacts of the power-supplying battery, the second connection ports being adapted to electrically connect to one of the charging power source and an external loading, so that the control circuit is operable to control and regulate electricity supplied to or supplied from the power-supplying battery.

3. The power-supplying battery of the electric vehicle according to claim 2, wherein the control circuit is provided with a preset output voltage setting value that provides a mechanism for limiting voltage output of the power-supplying battery.

* * * * *